United States Patent
Pugliese

[15] 3,695,647
[45] Oct. 3, 1972

[54] PIPE COUPLING

[72] Inventor: Joseph A. Pugliese, Fairview, N.J.

[73] Assignee: Hoke Incorporated, Cresskill, N.J.

[22] Filed: July 16, 1970

[21] Appl. No.: 55,428

[52] U.S. Cl. .............................................. 285/341
[51] Int. Cl. .............................................. F16l 19/06
[58] Field of Search ........................... 285/341, 374

[56] References Cited

UNITED STATES PATENTS

| | | | |
|---|---|---|---|
| 3,402,949 | 9/1968 | Mahoney | 285/341 |
| 3,120,969 | 2/1964 | Schmohl | 285/341 |
| 2,351,363 | 6/1944 | Parker et al. | 285/341 X |
| 3,445,128 | 5/1969 | Teeters | 285/341 |

FOREIGN PATENTS OR APPLICATIONS 1,181,844   1/1959   France ....................... 285/341

*Primary Examiner*—David J. Williamowsky
*Assistant Examiner*—Wayne L. Shedd
*Attorney*—Norman N. Holland

[57] ABSTRACT

A compression coupling for a pipe or tube having improved uncoupling and recoupling capabilities. The coupling is of the type wherein a tube is received into a body portion and is attached thereto by the action of one or more ring-like ferrules which are wedged between the tube and the body by a coupling nut. The improvement is principally in the shape of the tube receiving bore in the body which is made with angularly positioned tube sizing and tube braking surfaces. This shaping of the bore causes the tube when initially attached to and seated on the body to have a selective reshaping which facilitates tube removal and reinsertion regardless of dimensional variations in the body and tube sizes.

3 Claims, 8 Drawing Figures

PATENTED OCT 3 1972 3,695,647

INVENTOR.
JOSEPH A. PUGLIESE
BY
Norman W Hallam
ATTORNEY

INVENTOR.
JOSEPH A. PUGLIESE

INVENTOR.
JOSEPH A. PUGLIESE
BY
Norman O Hallow
ATTORNEY

PIPE COUPLING

BACKGROUND OF THE INVENTION

The present invention relates to compression pipe or tube couplings and more particularly to an improved tube receiving body member for such couplings.

Compression pipe or tube couplings attach tubes or pipes to another fixture without requiring threads in the coupled tubes or pipes. The fixture having the tube receiving body may be a valve or a gauge or a pipe element such as a T or other piping fixture. Couplings of this type, as for example, the couplings described in U.S. Pat. Nos. 3,215,457 and 3,445,128, owned by the assignee of the present invention, provide for fluid-tight couplings between the tube and the body using one or more ring-like ferrules which draw the tube against a seat or shoulder in the body and seal it against the body using the force of a threaded coupling nut.

Compression couplings are particularly useful for thin-walled tubing such as copper, brass, or stainless steel tubes as they permit effective and extremely strong and fluid-tight couplings to be made rapidly between such tubes and various body members without requiring the formation of threads in the tubes and without using thread sealing compounds.

A problem is presented, however, by the wide range of pipe or tube diameter tolerances present in such tubing. Relatively large variations in tube size tolerance taken with the expected and permissible tolerance ranges in the tube receiving bores in the body members present problems both in the initial coupling make-up as well as in uncoupling and remaking or replacement operations. Specifically, trouble is encountered when a tube which has been previously applied by a compression coupling is deformed to the extent that it cannot thereafter be readily uncoupled or coupled to a second body member.

The present invention provides an improved and novel body shape and a related coupling method which assure that tubes within the entire expected tolerance range will be initially connected and sealed to a first body having any receiving bore within the normal bore tolerance range and will thereafter be easily removed and recoupled to a second member having a differing bore within the bore tolerance range.

This improved result is obtained by a novel butt seal and tube seating means provided in the tube seating bore which is an improvement over the means of U.S. Pat. No. 3,402,949 owned by the assignee of the present invention.

Accordingly, an object of the present invention is to provide an improved compression-type tube coupling.

Another object of the present invention is to provide an improved compression-type tube coupling for being successively coupled and uncoupled and for being coupled to bodies having differing body bore diameters.

Another object of the present invention is to provide an improved tube seating means for the body portion of compression tube coupling.

Another object of the present invention is to provide an improved butt-seal means for coupling, uncoupling, and recoupling tubes using threadless compression couplings.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

The improvements in the coupling 1 of the present invention are principally incorporated in the design of the tube receiving shoulder portion 2 of the coupling body 3 as illustrated in FIGS. 1 through 5 and as illustrated in detail in the enlarged fragmentary view of the shoulder in FIG. 6. FIGS. 1 through 5 illustrate a typical threadless tube 4 being attached to the body 3 using a preferred coupling means wherein a conically shaped body bore 5 cooperates with a pair of ring-like ferrules 6 and 7 and a threaded nut 8 in forcing the tube 4 into sealing engagement with the body. While other ferrule means may be used with the tube body 3 of the present invention, best results are obtained with ferrules which engage the connected tube 4 after the coupling has been assembled in finger-tight relationship and which then drive the tube into firm sealing relationship with the coupling body shoulder portion 2 while simultaneously forming seals themselves between the body 3 and the tube 4.

The improved coupling utilizing a body 3 in accordance with the invention will accordingly be described below as used with a preferred ferrule and nut arrangement of the type illustrated in FIGS. 1 through 5.

The preferred ferrule and nut will first be described generally and then their cooperation with the improved body will be covered in greater detail.

Figure 1:
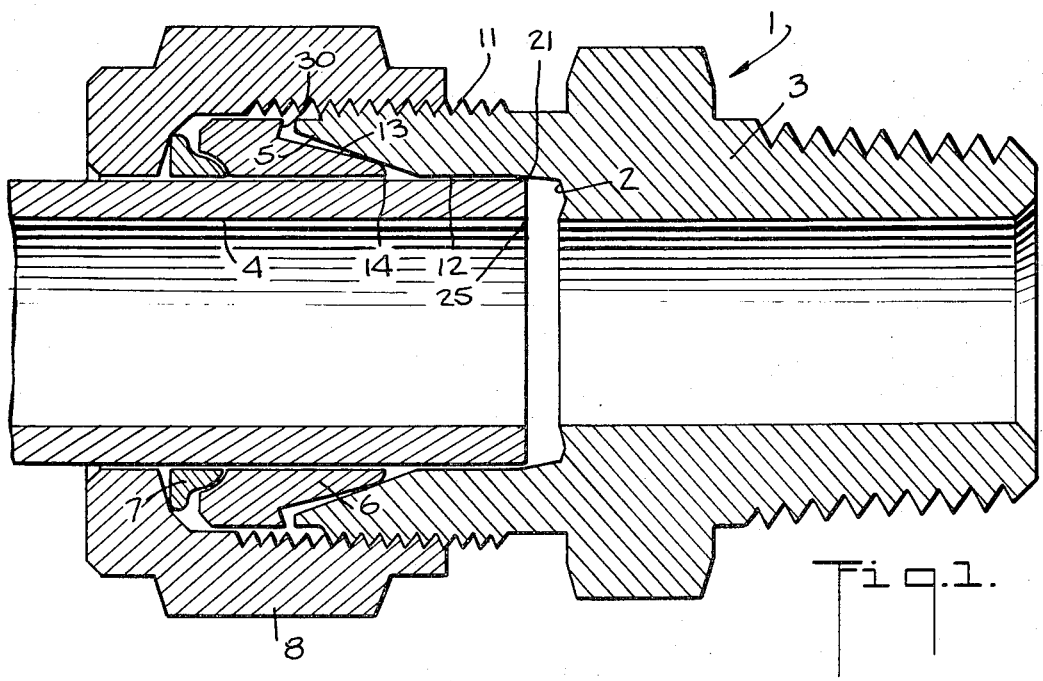
FIG. 1 is a vertical sectional view of a preferred embodiment of a compression coupling in accordance with the present invention showing a threaded body member receiving an unthreaded tube and including a preferred ferrule and nut means for making up the coupling.

This compression coupling has the ring-like ferrules 6 and 7 as illustrated in FIG. 1 whose inner surfaces and front edges 9 and 10, in particular, are forced inwardly against the tube 4 under the force of the threaded coupling nut 8 as the nut 8 is turned onto suitable threads 11 on the body 3. A threaded nipple is illustrated as the body 3 in the following description, however, it is to be understood that the nipple is merely illustrative and a tube receiving bore in accordance with the invention may be provided on various fixtures such as valves and gauges and others. The tube receiving bore in the body 3 includes the outer flared portion 5 terminating in a cylindrical inner bore 12 whose detailed shape in accordance with the present invention will be described further below.

The inner ferrule 6 has a flared outer surface 13 which engages with the flared surface 5 of the bore to force the inner edge 14 of ferrule 6 inwardly as the nut 8 is applied resulting in a corresponding inward movement in the tube 4 tightly against the bore shoulder portion 2 and a subsequent further controlled penetration of the ferrule edge 14 into the tube 4 to provide a combined mechanical and fluid seal between the tube 4 and the body 3.

Figure 4:
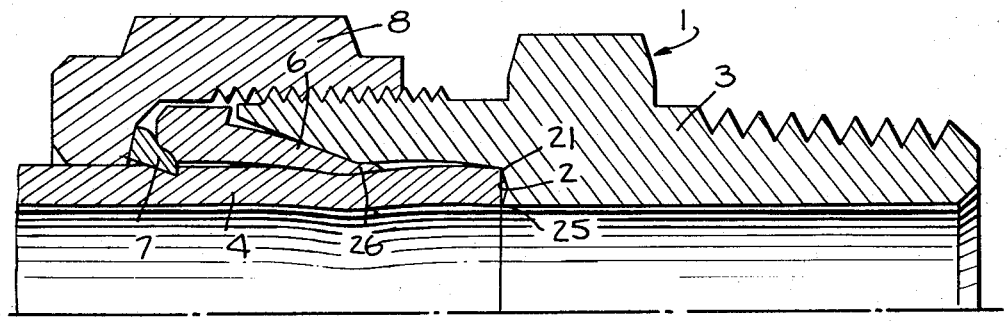
Figure 5:
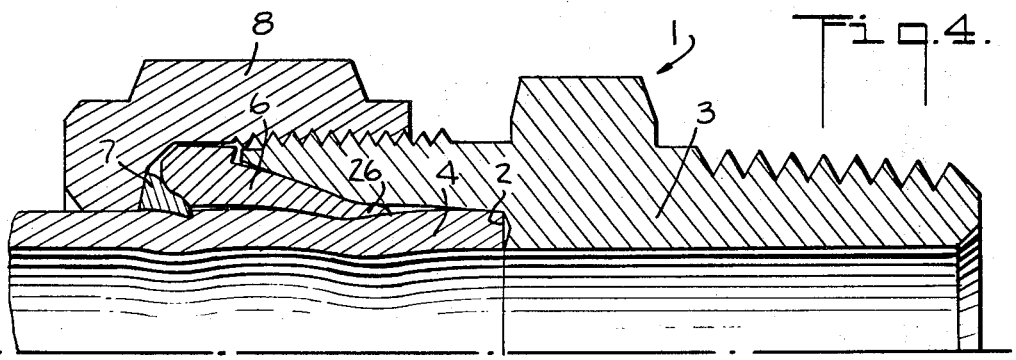

The rear ferrule 7 illustrated in FIG. 1 has a concave outer surface 15 engaging a complimentary concave surface 16 at the rear of the front ferrule 6 which provides for a further sealing action of the combination as the rear ferrule 7 rolls or gyrates inwardly against the tube 4 in the general manner illustrated in FIGS. 4 and 5.

The above described ferrules 6 and 7 and nut 8 are typical of those useful with the improved body of the present invention, however, it is clear that other types of ferrules which act to force the tube 4 inwardly and which provide both a mechanical and a fluid seal are useful with an improved tube receiving body in accordance with the present invention.

Many pipes or tubes which are connected by compression couplings are formed by extrusion processes and have a relatively wide diameter tolerance range. Certain tubes may only just fit into the internal bore of the corresponding fitting particularly where the fitting itself has an inner diameter at the minimum end of the bore tolerance range. The slightest outward flare or buckling of the tube end resulting from the application of the ferrules and the nut in this case tends to prevent a subsequent disassembly and reassembly of the coupling as the tube may then have an outer dimension greater than that of the subsequent tube receiving bore.

The novel body design of the present invention prevents this subsequent misfit of the tube and body by forming an inward taper on the tube end where necessary during the initial coupling without otherwise distorting the tube and while providing a smooth positive coupling make-up. Additionally, the improved body of the present invention permits ready disassembly without interference between the tube and the body when the tube is withdrawn from the body during disassembly.

The formation and coupling make-up action of the body will now be described in greater detail with particular reference to the enlarged and detailed FIG. 6 and FIGS. 1 through 5 which show successive positions of the ferrules 6 and 7, tube 4, and body 3.

Figure 6:
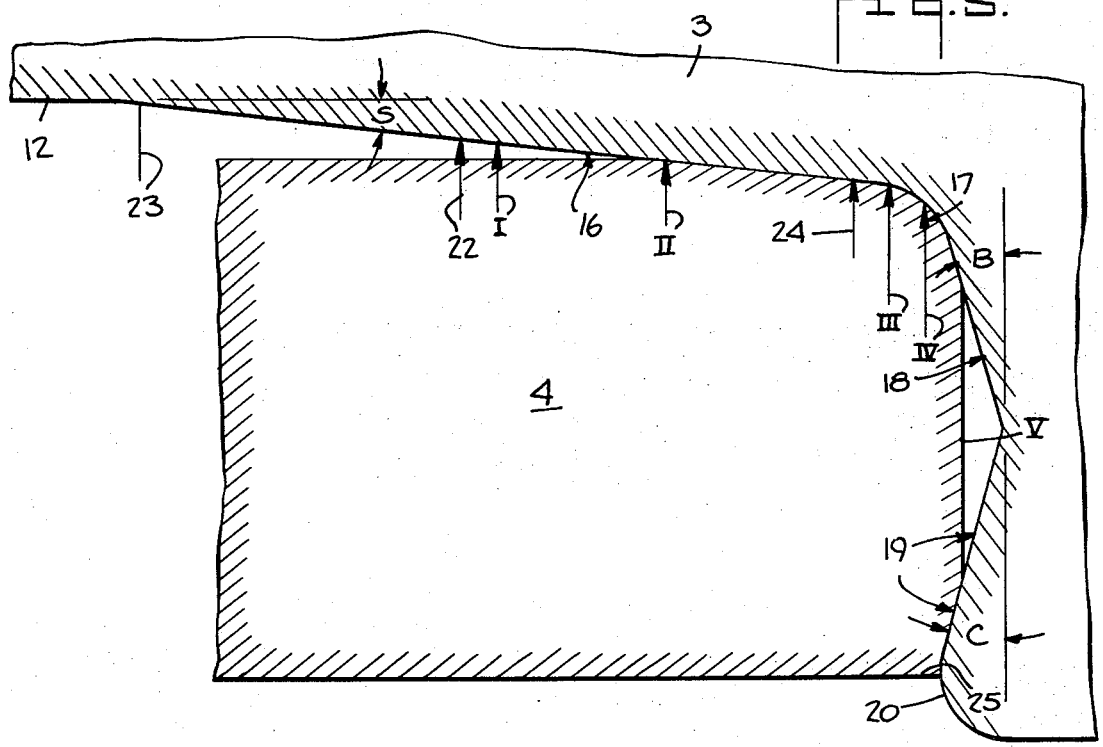
FIG. 6 is an enlarged detailed sectional view illustrating the preferred form of the tube receiving shoulder in the coupling body in accordance with the present invention.

FIG. 6 illustrates in detail the preferred shaping of the tube receiving shoulder 2 in the improved coupling body 3. This shoulder 2 is shaped to have an inwardly flared portion or tube sizing angle 16 extending from the cylindrical bore 12 in the body 3 and terminating at a radius 17 adjacent to the tube receiving shoulder 2. The small radius 17 at the inner end of the tube sizing angle 16 terminates in an inwardly directed surface 18 having an acute angle with the bore diameter. This angular portion of the tube shoulder has a braking function during tube assembly and is known as the brake angle portion. The radially innermost portion of the tube shoulder 2 has a portion 19 oppositely flared from the brake angle portion 18 and this portion 19 of the tube shoulder 2 forms a seal with the tube 4 end and is known as the butt-seal portion 19 of the tube seating means or shoulder 2. The butt-seal portion 19 also preferably terminates in a radius or rounded corner 20.

FIG. 6 indicates several successive positions which a tube occupies as it is being driven into its coupled or made-up position in the coupling. These several positions correspond generally to the successive coupling 1 positions illustrated in FIGS. 1 through 5 and will be explained with reference to these figures.

The following general criteria are relevant to the preferred proportions and angular alignments of the several important elements in the tube seating means or shoulder 2. These criteria are useful in determining the size and angles for a variety of differing tube sizes for which the improved seating means is useful.

The tube sizing angle 16 is seen to flare inwardly from the cylindrical bore portion 12 of the body member 3 and to terminate in the small radius 17 leading into the angularly aligned tube brake angle portion 18. The function of the tube sizing angle portion is to bevel or work the outer edge portion 21 of the coupled tube 4 where necessary and particularly where the tube 4 is at the outer tolerance range to assure easy disassembly and reassembly of the coupling.

For a particular tubing size, the central portion of the sizing angle portion 16 as indicated by arrow 22 is given a diameter corresponding to the nominal diameter of that tube size. A second arrow 23 indicates the point of contact for a tube having the maximum diameter tolerance for that particular size and this arrow 23 is seen to be positioned outwardly on the flared portion of the tube sizing angle 16. Similarly, a third arrow 24 indicates the contact point of a tube having the smallest tolerance. This arrow 24 is seen to be on the tube sizing angle portion 16. It is thus seen that all tubes when being initially inserted into the body will strike somewhere on the tube sizing angle and will be beveled or worked as the tube 4 is moved against the end tube braking angle portion 18 and the tube butt-seal portion 19 of the shoulder 2.

A relatively shallow angle has been found preferable for the tube sizing angle portion 16 and a preferred angle S may be about 6° for typical tubing sizes such as tubing sizes 1 through 16. This angle may be increased for tubing of softer materials including copper tubing and may in certain cases be a lesser angle for the relatively hard stainless steel tubing. The shaping of the tube shoulder 2, illustrated at the right side of FIG. 6, shows the preferred braking angle 18 and the spaced butt-seal surface 19. The tube braking angle 18 functions to provide a motion arresting surface for the outer edge 21 of the tube 4 while assuring a firm butt-seal on the butt-seal surface 19 for the inner edge 25 of the tubing. The butt-seal surface 19 preferably terminates in the round corner 20 to assure a firm high-pressure contact around the entire inner edge 25 of the tube 4. The tube braking angle 18 is set to facilitate the final advance of the tube 4 accompanied by an increase in nut torque to signal the assembler that coupling make-up has been completed. A satisfactory angle for the tube brake angle B for copper and stainless steel tubing in sizes 1 to 16 is about 15°. The angle C for the butt-seal surface 19 may also be about 15°.

The improved shoulder 2 in the body 3 will now be described in connection with the making-up of a coupling 1 using the preferred nut and ferrule combination as illustrated in FIGS. 1 through 5.

This discussion will make reference to relative positions of the front and rear ferrules 6 and 7 during a nut 8 movement of 1¼ turns.

Figure 7:
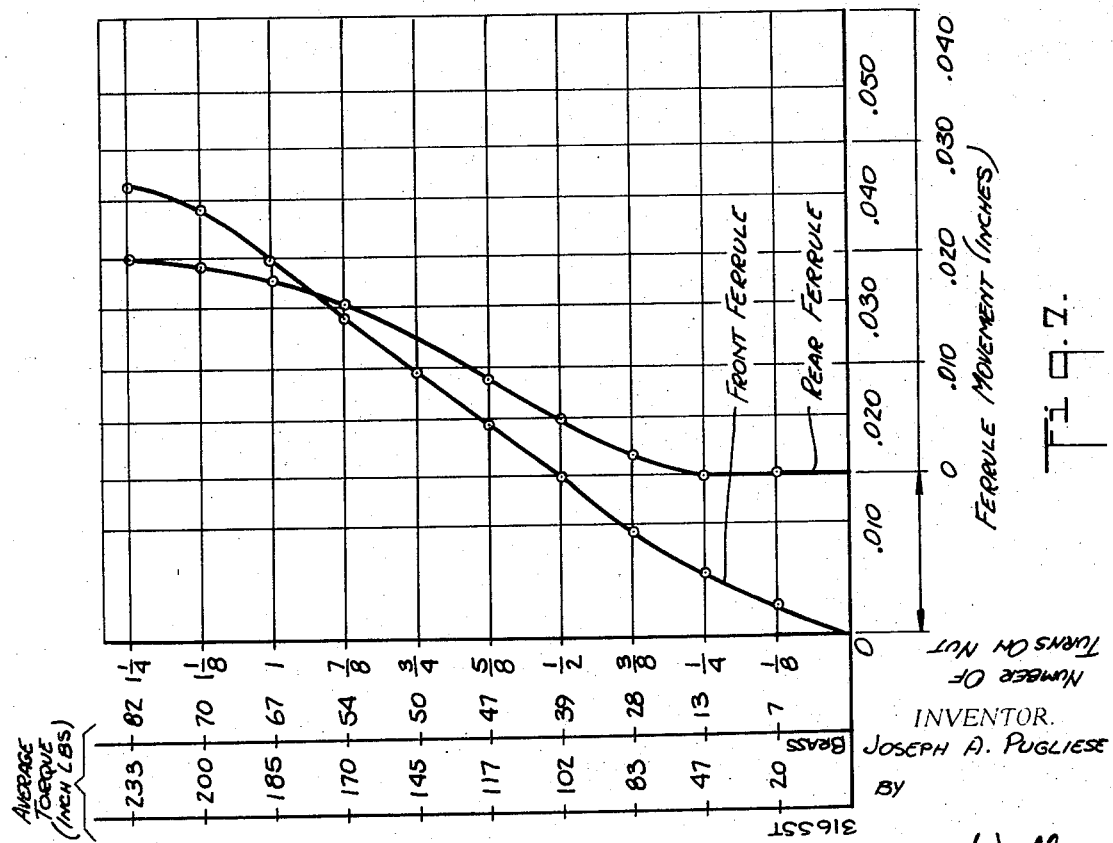
FIG. 7 is a graph illustrating the movement of the front and rear ferrules during the make-up of the coupling of the invention.

FIG. 7 illustrates in graph form the movement of the front ferrule 6 with respect to the coupling body 3 during coupling make-up and also illustrates the movement of the rear ferrule 7 relative to the front ferrule 6 during the coupling make-up. The successive positions of the various coupling elements illustrated in FIGS. 1 through 5 which show the finger-tight position, one-quarter turn, one-half turn, one turn, and one and one-quarter turn, respectively, are also shown graphically on FIG. 7.

FIG. 1 illustrates the improved body 3 in accordance with the invention being coupled to a typical tube 4 using a preferred double ferrule and not coupling arrangement. In FIG. 1, the tube 4 has been lightly projected into the bore 12 of the coupling body 3 so that it has come to rest with its forward edge 21 in engagement with the above described tube sizing angle portion 16 of the body shoulder 2. The front ferrule 6 and the rear ferrule 7 have been slipped into position on the tube 4 and the nut 8 has been turned lightly to place the entire coupling in finger-tight relationship.

A conventional and convenient design for threaded couplings of this general type provides for the complete making up of a coupling by a one and one-quarter turn of the coupling nut. FIGS. 2 through 5 show successive positions during the turning of the nut. The position of the tube in FIG. 1 is illustrated at arrow I in FIG. 6.

Figure 2:
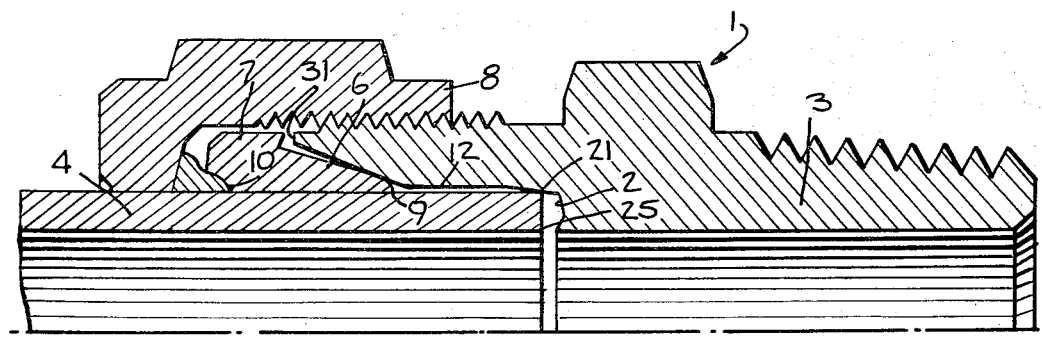
FIGS. 2 through 5 are vertical sectional views corresponding to FIG. 1 showing the tube, ferrules and nut in a series of successive positions during the making-up of the coupling.

FIG. 2 shows the coupling 1 after a one-quarter turn is made on the nut 8. The tube 4 is seen to have advanced whereby its forward edge 21 has moved along the sizing angle 16 toward the braking angle portion 18 of the shoulder 2. During this movement, the edge 21 of the tube 4 will have been slightly deformed or worked to permit this movement. The front ferrule 6 is seen to have moved forward so that it approaches the intersection between the conical portion S of the body 3 and the interior straight bore portion 12. Meanwhile, the nut 8 has moved the rear ferrule 7 towards the body 3 with little or no relative motion between the rear ferrule 7 and the front ferrule 6 as they are moving as a unit during the first quarter turn. The position of the edge 21 of tube 4 is illustrated at arrow II in FIG. 6.

Figure 3:
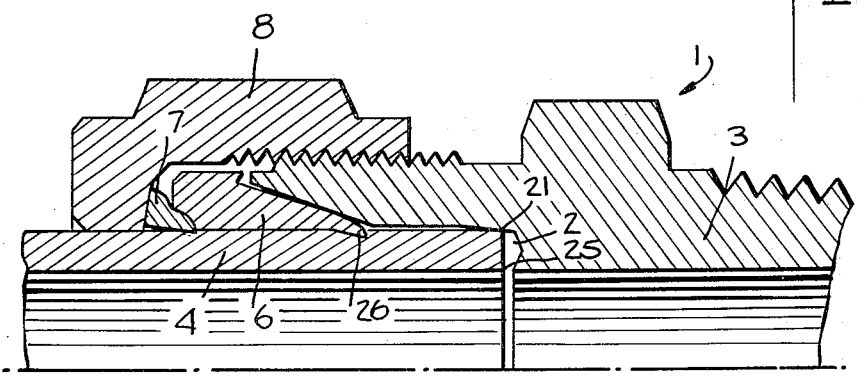

FIG. 3 illustrates the condition of the coupling 1 after the nut 8 has been advanced to one-half turn. This half turn has caused the nut 8 to move the front and rear ferrules 6 and 7 forward as these are simultaneously forced into engagement with the tube 4 thereby exerting a greater axial force on the tube 4. This force has further advance the forward edge 21 of the tube along the sizing angle portion 16 reducing its spacing from the braking angle 18 and the butt-seal 19 portions to approximately one-quarter of the original finger-tight spacing.

This position of the tube is indicated at arrow III in FIG. 6. It is seen that a further beveling or deformation of the leading edge of the tube will have resulted.

FIG. 4 illustrates the coupling elements at the completion of one full turn of the coupling nut 8. In this position, the tube 4 has been driven forward to the point where its outer edge 21 is in engagement with the radius 17 leading into the outer portion of the braking angle 18 and where its inner edge 25 has moved into contact with the butt-seal portion 19 of the shoulder 2.

Both the front and rear ferrules 6 and 7 are seen to have advanced with respect to the body 3 with the front ferrule 6 making a greater advance with its forward edge 26 tightly wedged between the coupling body 3 and the tube 4 surface forming a fluid seal. This position of the tube 4 with respect to the body 3 is indicated in FIG. 6 at arrow IV.

FIG. 5 illustrates the fully made-up coupling 1 after a one and one-quarter turn of the coupling nut 8. In this position, the tube 4 has been forced forward so that its inner edge 25 is in tight sealing engagement with the butt-seal portion 19,20 of the shoulder 2.

The formation of this seal has been facilitated by the motion resisting or braking effect of the braking angle portion 18 of the shoulder 2. This action in stopping the forward advance of the tube has caused a substantial resistance to nut 8 movement to be made apparent to the coupling assembler indicating that the coupling is completely made up or assembled. The front ferrule 6 at this point is tightly wedged with its front portion 26 between the body 3 and the tube 4 to provide a secondary fluid seal in addition to the above noted butt-seal. The rear ferrule 7 has been advanced and turned with its forward edge 27 in biting engagement with the tube 4 to provide increased mechanical strength for the coupling. This fully made-up position is illustrated by the tube 4 end shown in made-up position in FIG. 6.

The tube 4 is now seen to have been forced into a butt sealing arrangement and to simultaneously have its outer edge portion 21 shaped or beveled to have a reduced diameter without significant deformation or bulging of adjacent portions of the tube 4. This reduced tube end size assures ready disengagement of the tube 4 from the body 3 when the coupling 1 is opened up and thereafter assures that the tube 4 may be reconnected with this or any other appropriately sized coupling body 3.

Figure 8:
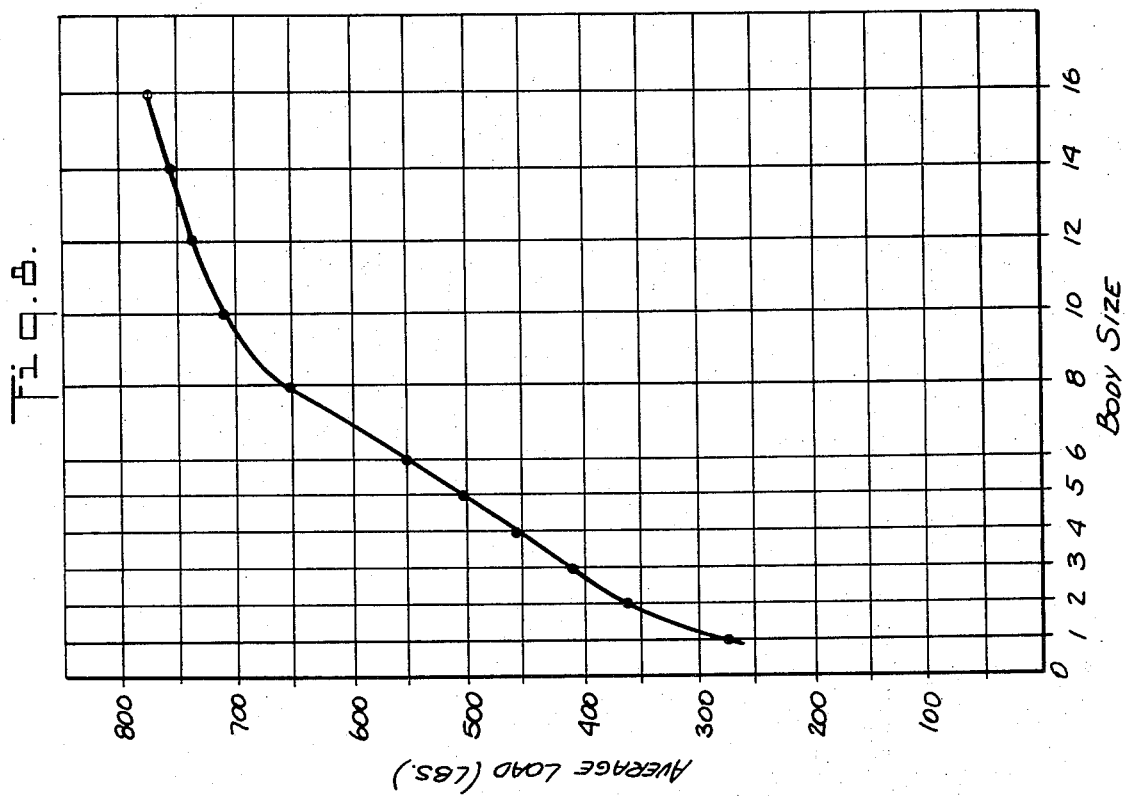
FIG. 8 is a graph showing average make-up loads or forces present between a tube and body at the butt-seal area obtained with typical fittings in several sizes made in accordance with the present invention.

This coupling design including the preferred seating means or shoulder 2 has been found to provide a fluid-tight butt-seal. Suitably great forces or loads have found to exist between the tube 4 end and the body 3 assuring an effective butt-seal. While the total force between the tubes and the bodies varies with tube sizes, FIG. 8 showing the forces indicates satisfactory loads of several hundred pounds or more for a representative range of coupling sizes.

A preferred shaping of the front ferrule 6 is illustrated in FIGS. 1 through 5. The front shoulder of the ferrule 6 is seen to have a reverse angle or camber at 30. When the coupling is remade, the reverse angle portion 30 will engage and restrain the adjacent portion 31 of the coupling body 3 from expanding thereby preventing the nut 8 from binding on the body threads 11.

It will be seen that an improvement has been provided for compression-type couplings for extending the usefulness of these couplings and for permitting ready assembly, disassembly, and reassembly of fluid systems employing such couplings. The improved results are obtained by a significant but relatively easily made shaping of the tube receiving seat or shoulder in the coupling body.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A compression tube coupling in combination with a tube, the coupling including a body having a bore containing the tube which body includes in succession from the outer end a flared outer end portion, a cylindrical portion, a conical surface having an innermost diameter less than the outer diameter of a tube of the smallest tolerance and an outer diameter greater than the outer diameter of a tube of the largest tolerance of a given nominal diameter, and a tube end engagement shoulder, the inner end of said cylindrical portion connecting with the conical surface, said conical surface having its inner end positioned at said shoulder, said shoulder having a generally V-shaped axially outwardly facing surface in axial cross section, the radially outward leg of the V having a rounded outer edge in cross-section and forming a tube braking surface engaging the outer edge of the tube and braking the tube motion toward its assembled position, the radially inward leg of the V forming a relatively straight butt seal surface engaging the inner edge of the tube and forming a seal with the tube and simultaneously causing a controlled bulging of the tube end portion, ferrule means engaging the tube and wedged between the outer flared portion of the bore and the tube, a nut engaging the ferrule means for forcing the end of the tube against said shoulder, and the tube having a portion adjacent to its end in engagement with the conical surface of the bore and having its end permanently deformed and in sealing engagement with said rounded outer edge and with said butt seal surface of said shoulder.

2. The coupling as claimed in claim 1 in which said ferrule has an outwardly extending shoulder with a radially inwardly and axially rearwardly sloping front surface for engaging the body end to limit body expansion when the coupling is made up.

3. The coupling as claimed in claim 1 in which said braking surface has an angle of about 10° to 20° with the tube radius and said conical surface has a half-cone angle of between 10° and 20°.

* * * * *